(12) United States Patent
Yuge et al.

(10) Patent No.: US 8,084,505 B2
(45) Date of Patent: Dec. 27, 2011

(54) SUBSTANCE-CONTAINING CARBON NANOHORN COMPOSITE HAVING POLYAMINE PLUG AND PROCESS FOR PRODUCING THE SAME

(75) Inventors: Ryota Yuge, Tokyo (JP); Hideki Yorimitsu, Kyoto (JP); Masako Yudasaka, Tokyo (JP); Sumio Iijima, Tokyo (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 12/307,473

(22) PCT Filed: Jul. 3, 2007

(86) PCT No.: PCT/JP2007/063268
§ 371 (c)(1),
(2), (4) Date: Jan. 5, 2009

(87) PCT Pub. No.: WO2008/004532
PCT Pub. Date: Jan. 10, 2008

(65) Prior Publication Data
US 2009/0208567 A1   Aug. 20, 2009

(30) Foreign Application Priority Data
Jul. 7, 2006   (JP) ............................... 2006-187321

(51) Int. Cl.
*A61K 9/14*   (2006.01)
*A61K 31/13*   (2006.01)
*A61K 31/16*   (2006.01)
*A01N 33/00*   (2006.01)
*A01N 33/02*   (2006.01)

(52) U.S. Cl. ........ 514/769; 424/489; 514/579; 514/663; 514/673; 977/734; 977/736; 977/740; 977/744; 977/748; 977/750

(58) Field of Classification Search ......................... None
See application file for complete search history.

(56) References Cited

FOREIGN PATENT DOCUMENTS

| JP | 2002-326032 A | 11/2002 |
|----|---------------|---------|
| JP | 2004-016909 A | 1/2004  |
| JP | 2005-343885 A | 12/2005 |
| JP | 2006-028421 A | 2/2006  |
| WO | WO-2007/004545 A1 | 1/2007 |
| WO | WO-2007/078007 A1 | 7/2007 |

OTHER PUBLICATIONS

Ajima et al. (Molecular Pharmaceutics 2005 vol. 2(6); pp. 475-480).*
Lippert (Cisplatin: chemistry and biochemistry of a leading anticancer drug 1999, Helvetica Chimica Acta pp. 224-226 in part: 4 pages).*
Ryota Yuge et al.; "Release-control of $C_{60}$ by polyamine-plugs on nanohorn holes"; The Fullerenes and Nanotubes Research Society, Jul. 12, 2006, (IP-37), p. 95.
Masako Yudasaka, et al.: "Carbon Nanotube to Carbon Nanohorn no DDS Oyo"; Pharm Tech Japan, Special extra issue, Oct. 28, 2005, vol. 21, No. 12, pp. 176 to 180.
Tatsuya Murakami, et al.:"Drug-Loaded Carbon Nanohorns: Adsorption and Release of Dexamethasone in Vitro"; Molecular Pharmaceutics, 2004, vol. 1, No. 6, pp. 399-405.
Ayaka Hashimoto, et al.: "Selective deposition of a gadolinium(II) cluster in a hole opening of single-wall carbon nanohorn"; PNAS (Proc. Nat. Acad.Sic), Jun. 8, 2004, vol. 101, No. 23, pp. 8527-8530.

* cited by examiner

*Primary Examiner* — Ernst Arnold
(74) *Attorney, Agent, or Firm* — Dickstein Shapiro LLP

(57) ABSTRACT

The present invention provides: a carbon nanohorn composite including a carbon nanohorn, a substance encapsulated in the carbon nanohorn, and a polyamine adsorbed by chemical reaction firmly to a surface functional group present on the opening part on the surface of the carbon nanohorn, wherein the release amount and release rate of the encapsulated substance can be controlled using the difference in size, substituent or three-dimensional structure of the polyamine, which is used as a plug; a method of controlling the release of the encapsulated substance; and a process for producing the carbon nanohorn composite. The release amount and release rate of the substance encapsulated in the carbon nanohorn composite is controlled by selecting a polyamine molecule, which plugs the opening part formed in the carbon nanohorn by oxidation, by its size, substituent or three-dimensional structure.

14 Claims, 7 Drawing Sheets

SUBSTANCE-CONTAINING CARBON NANOHORN COMPOSITE HAVING POLYAMINE PLUG AND PROCESS FOR PRODUCING THE SAME

FIELD OF THE INVENTION

The present application claims priority to Japanese Patent Application No. 2006-187321 filed on Jul. 7, 2006, the entire disclosure of which is incorporated herein by reference.

The present invention relates to a substance-encapsulated carbon nanohorn composite having a polyamine plug, a process for producing the same, and to controlling a release amount and a release rate of an encapsulated substance using the substance-encapsulated carbon nanohorn composite having a polyamine plug.

DESCRIPTION OF THE RELATED ART

In recent years, an examination has been made of the use of various inorganic substances as drug carriers in drug delivery systems. Of inorganic substances used as drug carriers, nanoparticles attract a special attention, and lots of reports about such nanoparticles have been given.

Under these circumstances, there is a growing interest in carbon nano-materials, nanosized materials, such as carbon nanotubes and carbon nanohorns, and attempts have been made to modify such carbon nano-materials to allow them to have properties, such as biocompatibility and drug properties, as well as the properties originated from the structure peculiar to nanosize substances.

For example, Japanese Patent Laid-Open No. 2005-343885 discloses a novel carbon nanohorn composite the inside of which a functional organic molecule with physiological activity or pharmacological activity has been introduced into and carried on, directing attention to the unique structure and character of carbon nanohorns, and a process for producing the same.

Further, Mol. Pharm., 2004, 1, 399 states that the carbon nanohorn composite having a drug introduced into the inside has controlled-release property, and is therefore, applicable to drug delivery systems (DDS).

Proc. Nat. Acad. Sci., 2004, 101, 8527 has already reported that the opening of a carbon nanohorn is closed when it carries a gadolinium compound, whereby a molecule, such as fullerene, is not introduced inside the nanohorn.

However, the techniques reported in Japanese Patent Laid-Open No. 2005-343885, Mol. Pharm., 2004, 1, 399 and Proc. Nat. Acad. Sci., 2004, 101, 8527 present some problems. For example, the encapsulated substance is spontaneous by released, and therefore, the encapsulated substance cannot be selectively released in the body. And the gadolinium compound carried on a carbon nanohorn comes off easily in an aqueous solution. Thus, such carbon nanohorn composites are difficult to come in practice as carriers for DDS.

The present invention has been made in the light of the above problems. Accordingly, an object of the present invention is to provide a carbon nanohorn composite, including a carbon nanohorn, a substance encapsulated in the carbon nanohorn and a polyamine adsorbed by chemical reaction firmly to a surface functional group present on the opening part on the surface of the carbon nanohorn, wherein the release amount and release rate of the encapsulated substance can be controlled using the difference in size, substituent or three-dimensional structure of the polyamine, which is used as a plug; a method of controlling release of an encapsulated substance; and a process for producing the carbon nanohorn composite.

SUMMARY OF THE INVENTION

To solve the above problems, the present invention has the following characteristics.

The present invention is a carbon nanohorn composite, including a carbon nanohorn, a substance encapsulated in the carbon nanohorn and a polyamine plug, characterized in that the polyamine plug is a polyamine molecule which plugs the opening part of the carbon nanohorn having been formed by oxidation and is selected by its size, substituent or three-dimensional structure so that at least one of the release amount and release rate of the encapsulated substance can be controlled.

The present invention is a method of controlling release of the encapsulated substance from the carbon nanohorn composite described above, characterized in that a polyamine molecule whose three-dimensional structure changes in the pH range of 4 to 7, causing changes in the ratio of the plugged portion of the opening part is selected as the plug, thereby allowing the encapsulated substance to dissolve out in the surrounding environment and be released in a controlled manner.

The present invention is a method of controlling release of the encapsulated substance from the carbon nanohorn composite described above, characterized in that a polyamine whose substituent changes its molecular structure in the pH range of 4 to 7 is selected as the plug, thereby causing changes in the desorption ratio and desorption amount of the encapsulated substance.

The present invention is a method of controlling release of the encapsulated substance from the carbon nanohorn composite described above, characterized in that a polyamine whose substituent desorbs the polyamine plug in the pH range of 4 to 7 is used as the plug, thereby allowing the encapsulate substance to dissolve out in the surrounding environment and be released in a controlled manner.

Further, the present invention provides a drug for a drug delivery system (DDS), characterized in that the drug is any one of the above described carbon nanohorn composites having a substance encapsulated therein.

Further, the present invention provides a process for producing a carbon nanohorn composite having a substance encapsulated therein characterized in that any one of the above processes is used to produce the carbon nanohorn composite described above.

According to the present invention, the amount and rate of the encapsulated substance released in a solution is regulated by the size, substituent or three-dimensional structure of the polyamine plug plugging the opening part of the carbon nanohorn composite; thus, significant progress will be made toward putting a drug for DDS to practical use.

DETAILED DESCRIPTION OF THE INVENTION

Figure 1:
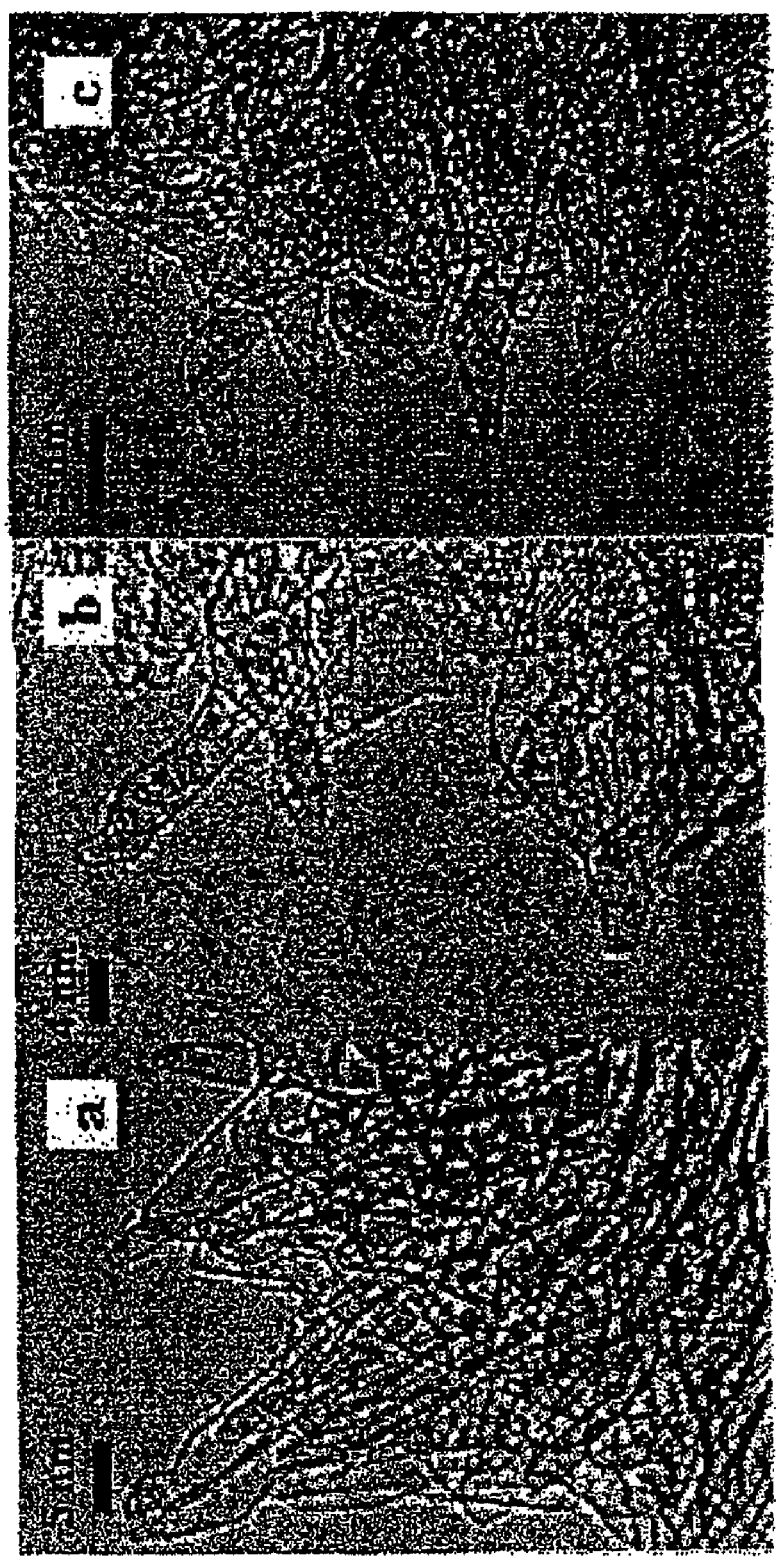
FIGS. 1(a), 1(b) and 1(c) are images of transmission electron microscope of an oxidation-treated nanohorn (NHox) prepared in Example 1 of the present invention, a $C_{60}$-encapsulated carbon nanohorn ($C_{60}$@NHox) prepared in Example 2 of the present invention, and a Bu-plugged $C_{60}$-encapsulated carbon nanohorn (Bu/$C_{60}$@NHox) prepared in Example 3 of the present invention, respectively.

In the following the embodiments of the present invention will be described.

Carbon nanohorns used as a starting material are obtained as an aggregate of carbon nanohorns each having a diameter of 2 to 5 nm. Aggregated structures are available in sizes from 30 to 150 nm. The size of the opening formed in a carbon nanohorn can be controlled by varying the oxidization conditions. In oxidation in oxygen, the size of the opening formed in a carbon nanohorn can be controlled by varying the oxidation temperature, and an opening 0.3 to 1.5 nm in diameter can be formed at oxidation temperatures of 300 to 580° C. An opening can also be formed by liquid-phase treatment using, for example, an acid.

The encapsulation of a substance in a carbon nanohorn in which an opening has been formed by oxidation is performed by mixing the carbon nanohorn having an opening and a substance to be encapsulated in a liquid phase and vaporizing the solvent. This is effectively done in an atmosphere of an inert gas.

The liquid-phase solvent used in the above operation can be selected appropriately, and any solvent that can dissolve the substance to be encapsulated can be introduced into the inside of a carbon nanohorn.

In this invention, the substance first introduced into the inside of a carbon nanohorn is a substance dissolved in the solvent and existing in the solution. Particularly, a carbon nano-material represented by fullerene, metal-containing fullerene or nano-diamond, an organic functional molecule such as dexomethazone (DEX), doxorubicin (DRX), tetrathiafulvalene (TTF) or tetracyanoquinodimethane (TCNQ), and a metal complex such as ferrocene, phthalocyanine or cisplatin can also be used.

As a plug for a substance-encapsulated carbon nanohorn composite in which an opening has been formed, a polyamine having amino groups is effective. For example, 1,4-diaminobutane, spermine, 1,1,4,7,10,10-hexamethyltriethylenetetramine, 1,4,8,11-tetramethyl-1,4,8,11-tetraazacyclotetradecane, butylamine are suitable, and glycine and folic acid can also be used.

Addition of a cap to the above substance-encapsulated carbon nanohorn composite in which an opening has been formed is suitably carried out in a solution which does not dissolve or hardly dissolves the encapsulated substance out. And the capped nanohorn composite is purified through a filter or the like after the mixed solution is fully stirred.

The release rate and amount of the encapsulated substance can be appropriately selected by selecting a polyamine because they depend on the size, substituent or three-dimensional structure of the polyamine selected. For example, selecting a polyamine having a large size can raise the release rate and selecting a polyamine having a large volume of substituent can decrease the release amount.

There are various substituents which are usable for the substitution of an amine as a plug. Examples of such substituents include carboxyl, lactone, phenol, carbonyl, acid anhydride and ether groups.

In cases where a substance-encapsulated carbon nanohorn composite having an amine plug is used as a drug delivery system (DDS), the reactivity of the amine or substituent selected should be considered to regulate desorption of the plug appropriately, because the pH at the affected area in the body varies from area to area. For example, pH at stomach is 1 to 3.5, pH at jejunum is 6 to 7, and pH at ileum is 8.

Considering that the inside of the digestive organ of cells is acid, a nanohorn carrier is designed so that its amine plug is desorbed or reacts to open the opening part of the nanohorn, when the pH of the surrounding environment becomes low, whereby the active ingredient encapsulated in the nanohorn is released. And the drug carried in the nanohorn carrier thus designed can be selectively released if the nanohorn carrier is introduced into the individual cancer cells in tumor part through an endocytic pathway the polyamine is allowed to respond to the low-pH environment (pH 5) in the lysosome.

Accordingly, any one of the following methods can be suitably used as a method for controlling the release, from the carbon nanohorn composite according to the present invention, of the substance encapsulated in the carbon nanohorn composite.

Specifically, a controlled-release method which uses, as a plug, a polyamine whose three-dimensional structure changes in the desired pH range, preferably in the pH range of 4 to 7, causing changes in the ratio of the plugged portion of the opening formed in the carbon nanohorn, thereby allowing the substance introduced into the carbon nanohorn to dissolve in the surrounding environment and be released in a controlled manner.

A controlled-release method which uses, as a plug, a polyamine whose molecular structure changes in the desired pH range, preferably in the pH range of 4 to 7 due to its substituent, causing changes in at least one of the desorption ratio and the desorption amount of the substance encapsulated in the carbon nanohorn.

A controlled-release method which uses, as a plug, a polyamine whose molecular plug is desorbed in the desired pH range, preferably in the pH range of 4 to 7 due to its substituent, thereby allowing the substance introduced into the carbon nanohorn to dissolve in the surrounding environment and be released in a controlled manner.

A carbon nanohorn composite including a substance encapsulated therein and a polyamine plug according to the present invention is suitably used in which the amino group of the polyamine molecule used as a plug is chemically adsorbed onto the carbonyl group or anhydride, as a surface substituent, on the surface of the opening portion of the carbon nanohorn having an opening formed by oxidation.

A carbon nanohorn composite including a substance encapsulated therein and a polyamine plug according to the present invention is suitably used in which the substance contained is any one selected from the group consisting of a drug to be taken, a metal, an inorganic material and an organic material, or the mixture of two or more thereof, or the compound thereof.

A carbon nanohorn composite including a substance encapsulated therein and a polyamine plug according to the present invention is suitably used in which after the substance as described above is contained in the carbon nanohorn having an opening formed by oxidation in a solution, a plug of polyamine molecule is adsorbed in a solution in which the encapsulated substance is not or hardly soluble so that the substance is not released from the inside of the carbon nanohorn during the plug formation.

A carbon nanohorn composite including a substance encapsulated therein and a polyamine plug according to the present invention is suitably used in which the substance introduced into the carbon nanohorn dissolves out from the inside the carbon nanohorn in the surrounding environment depending on the degree of the opening of the polyamine molecule, and thus being released in a controlled manner.

EXEMPLARY EMBODIMENTS

In the following the present invention will be described in more detail by several Examples. It goes without saying that these Examples are not intended to limit the present invention.

Exemplary Embodiment 1

Opening Formation in Carbon Nanohorn

As shown in the electron microscope image of FIG. 1a, an opening was formed in an untreated carbon nanohorn by heating the carbon nanohorn to 550° C. at a heating rate of 1° C./min in the air and then allowing to cool to room temperature.

Exemplary Embodiment 2

Introduction of Fullerene into Carbon Nanohorn

The carbon nanohorns (NHox) (30 mg) shown in FIG. 1a, in which an opening had been formed by oxidation, were dispersed in toluene (40 ml). A fullerene ($C_{60}$) was used as a substance to be encapsulated in each carbon nanohorn in which an opening had been formed by oxidation. The $C_{60}$ (10 mg) was immersed in the dispersion of carbon nanohorns in toluene, and after being fully stirred, the dispersion was dried by gradually vaporizing the toluene solvent in an atmosphere of nitrogen to produce $C_{60}$-encapsulated carbon nanohorns (hereinafter a $C_{60}$-encapsulated carbon nanohorn is expressed by "$C_{60}$@NHox"). The electron microscope images of these samples are shown in FIG. 1b. The samples thus obtained were subjected to thermogravimetric analysis (TGA) in pure oxygen at temperatures ranging from room temperature to 1000° C., and the amount of $C_{60}$ was estimated.

Figure 2:
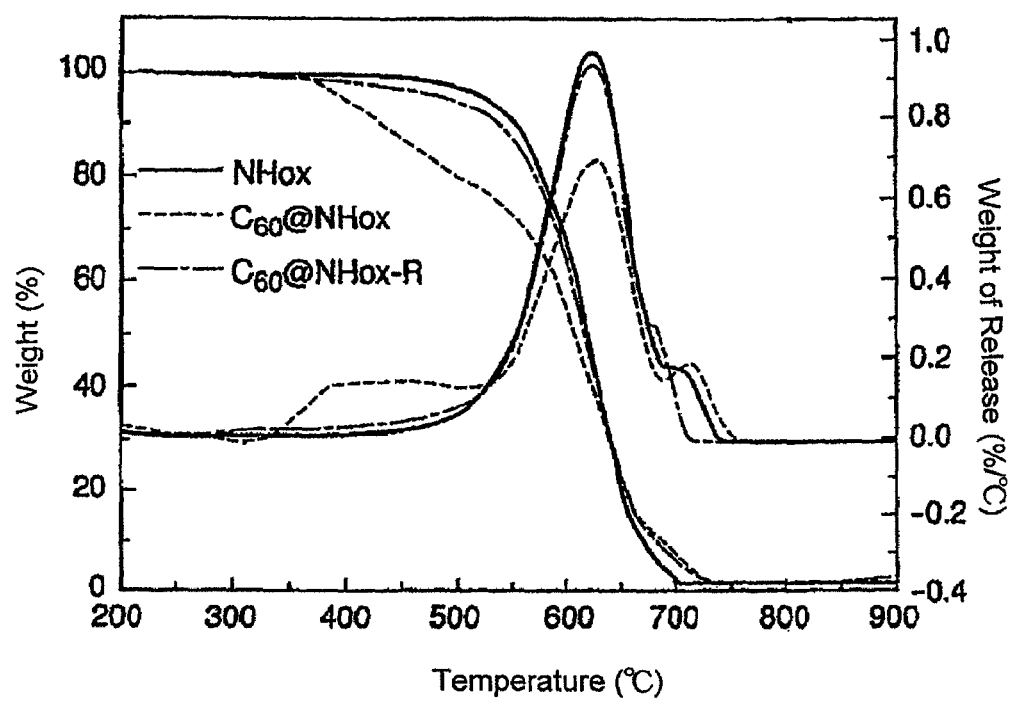
FIG. 2 is a graph illustrating the thermogravimetric analyses of an oxidation-treated nanohorn (NHox) prepared in Example 1 of the present invention, a $C_{60}$-encapsulated carbon nanohorn ($C_{60}$@NHox) prepared in Example 2 of the present invention, and a $C_{60}$-encapsulated carbon nanohorn ($C_{60}$@NHox-R) prepared in Example 3 of the present invention and rinsed with toluene.

FIG. 2 illustrates the weight loss curves obtained by TGA and the differential curves thereof. As shown in FIG. 2, the differential TGA curve of the NHox has two peaks at around 620° C. and 730° C., which corresponds to the peaks of the NHox and graphite impurities (GGB), respectively. In the differential TGA curve of the $C_{60}$@NHox, a peak, other than those of the NHox and GGB, is observed in the region of 350 to 500° C., which indicates the burning of the $C_{60}$. The weight loss shown in FIG. 2 revealed that the $C_{60}$ was contained in the NHox in an amount of 0.2 g/g in terms of $C_{60}$/(NHox+GGB) ratio.

The results of TGA were used in the estimation of the $C_{60}$ release amount by the measurement of UV/Vis absorption spectra described below.

The curves of $C_{60}$@NHox-R illustrate the results of TGA performed on the sample obtained by releasing $C_{60}$ from the $C_{60}$@NHox in toluene. As is seen from FIG. 2, the amount of the $C_{60}$ released form the $C_{60}$@NHox was estimated to be about 90%.

Exemplary Embodiment 3

Figure 3:
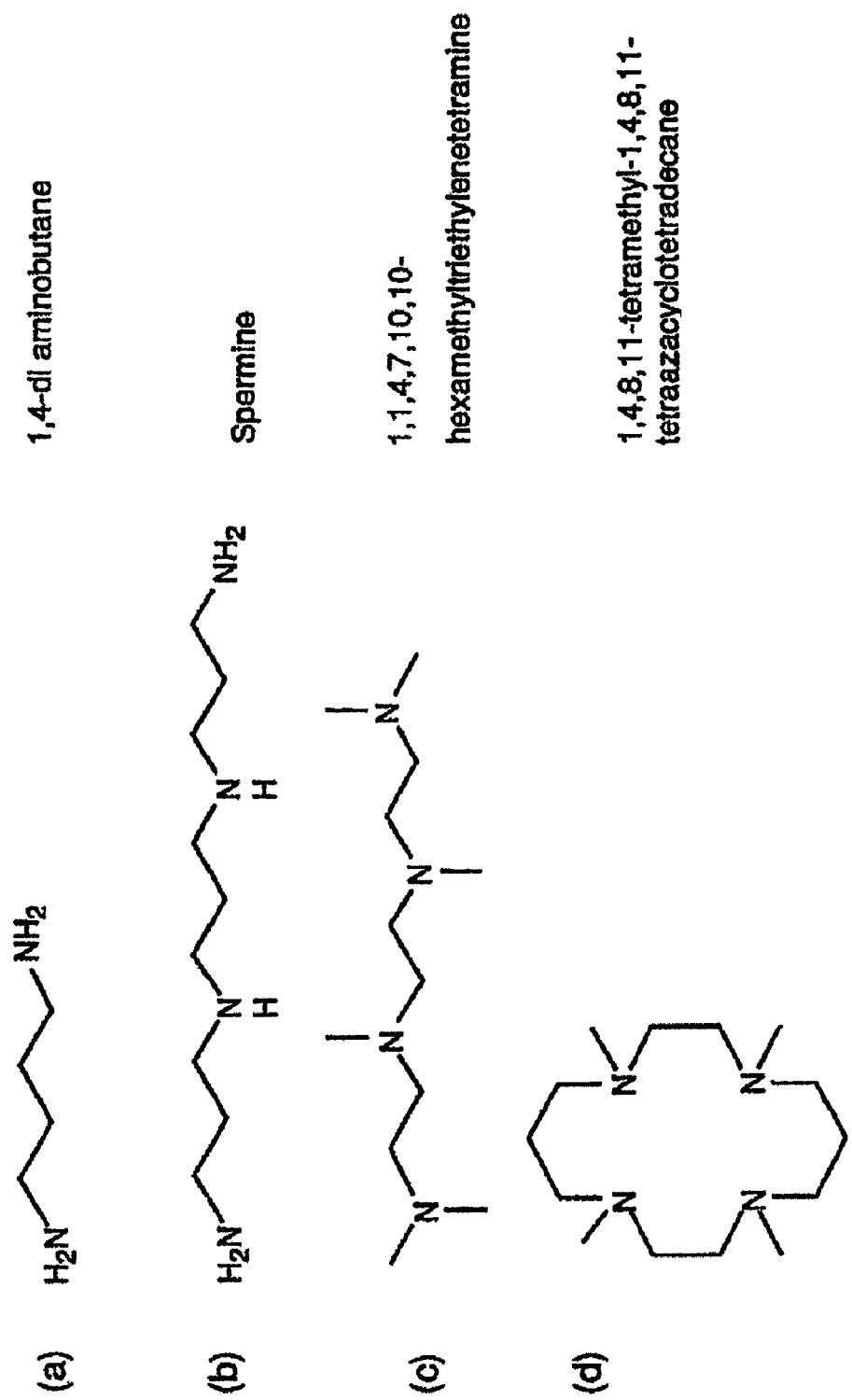
FIGS. 3(a), 3(b), 3(c) and 3(d) illustrate chemical structures of polyamines: 1,4-diaminobutane, spermine, 1,1,4,7,10,10-hexamethyltriethylenetetramine and 1,4,8,11-tetramethyl-1,4,8,11-tetraazacyclotetradecane, respectively.

Preparation of Polyamine Cap $C_{60}$-encapsulated carbon nanohorns (20 mg) and 1,4-diaminobutane, a kind of polyamine expressed by the structural formula of FIG. 3(a), (hereinafter referred to simply as "Bu") (20 mg) were dispersed in tetrahydrofuran (THF) (15 ml), in which $C_{60}$ is hardly dissolved, and the dispersion was stirred for about 24 hours. Then, the dispersion was filtered through a filter to remove the Bu dissolved in THF and the Bu not firmly adsorbed by the carbon nanohorns. The Bu-plugged $C_{60}$-encapsulated carbon nanohorns (Bu/$C_{60}$@NHox) remaining on the filter, shown in FIG. 1c, were fully dried in an inert gas.

This sample was subjected to thermogravimetric analysis in an atmosphere of helium at temperatures ranging from room temperature to 600° C. Under these conditions, $C_{60}$ and carbon nanohorns neither sublime nor decompose, and therefore, the amount of adsorbed Bu can be measured. The measurements revealed that 5% of the total weight of Bu was adsorbed.

Preparation of Polyamine Cap was Performed in the Same Operations as above for spermine (SP) expressed by the structural formula of FIG. 3(b), 1,1,4,7,10,10-hexamethyltriethylenetetramine (TE) expressed by the structural formula of FIG. 3(c) and 1,4,8,11-tetramethyl-1,4,8,11-tetraazacyclotetradecane (Cyc).

Exemplary Embodiment 4

Selective Release of $C_{60}$

The measurement of UV/Vis absorption spectra was performed in the wavelength region from 315 to 430 nm in a toluene solution. The absorption intensity was converted to $C_{60}$ concentration from the value of the mole absorption coefficient of $C_{60}$, and the $C_{60}$ adsorption amount was estimated.

Figure 4:
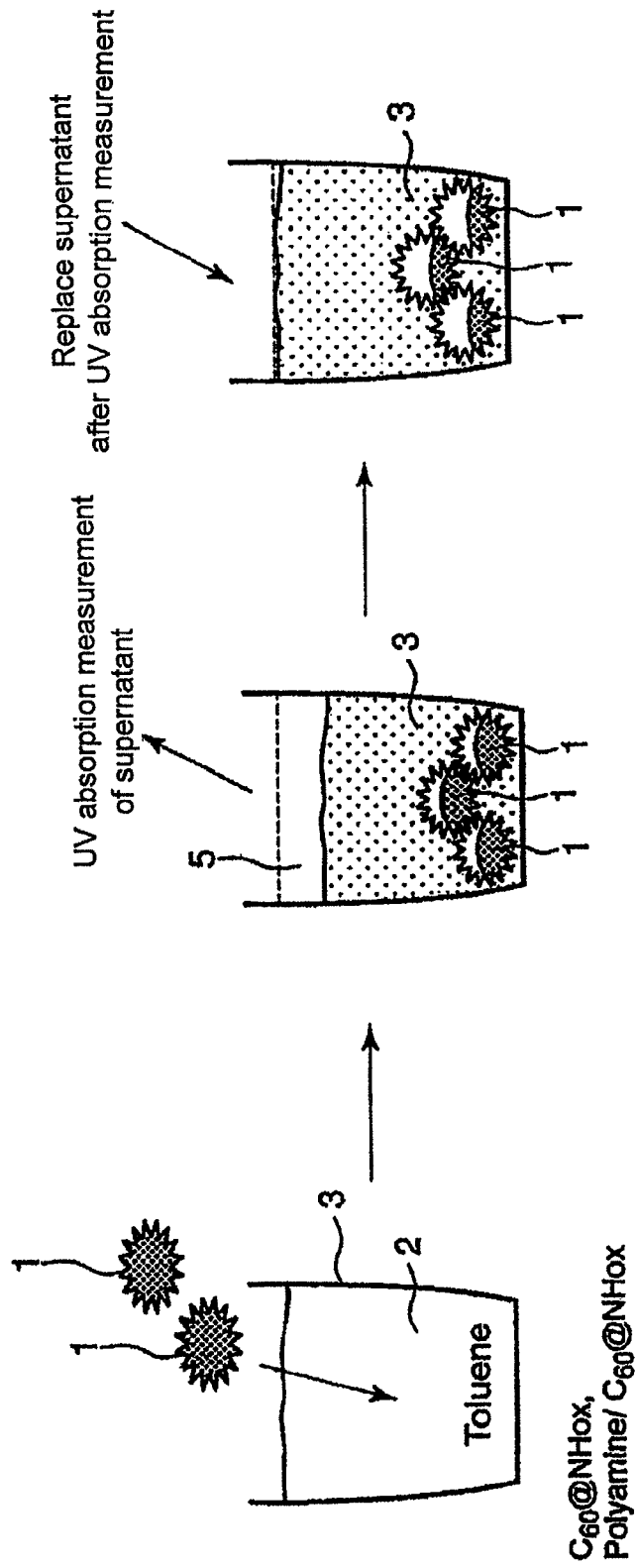
FIG. 4 is a schematic illustration of UV/Vis measuring experiment in Example 3 of the present invention.

UV/Vis absorption spectra were measured in such a manner as shown in FIG. 4. About 2 mg of each sample was immersed in toluene (300 ml) and 5 ml of the supernatant was used for the measurement. After the measurement, the supernatant was replaced. This operation was repeated at prescribed intervals. The results are shown in FIG. 5.

Figure 5:
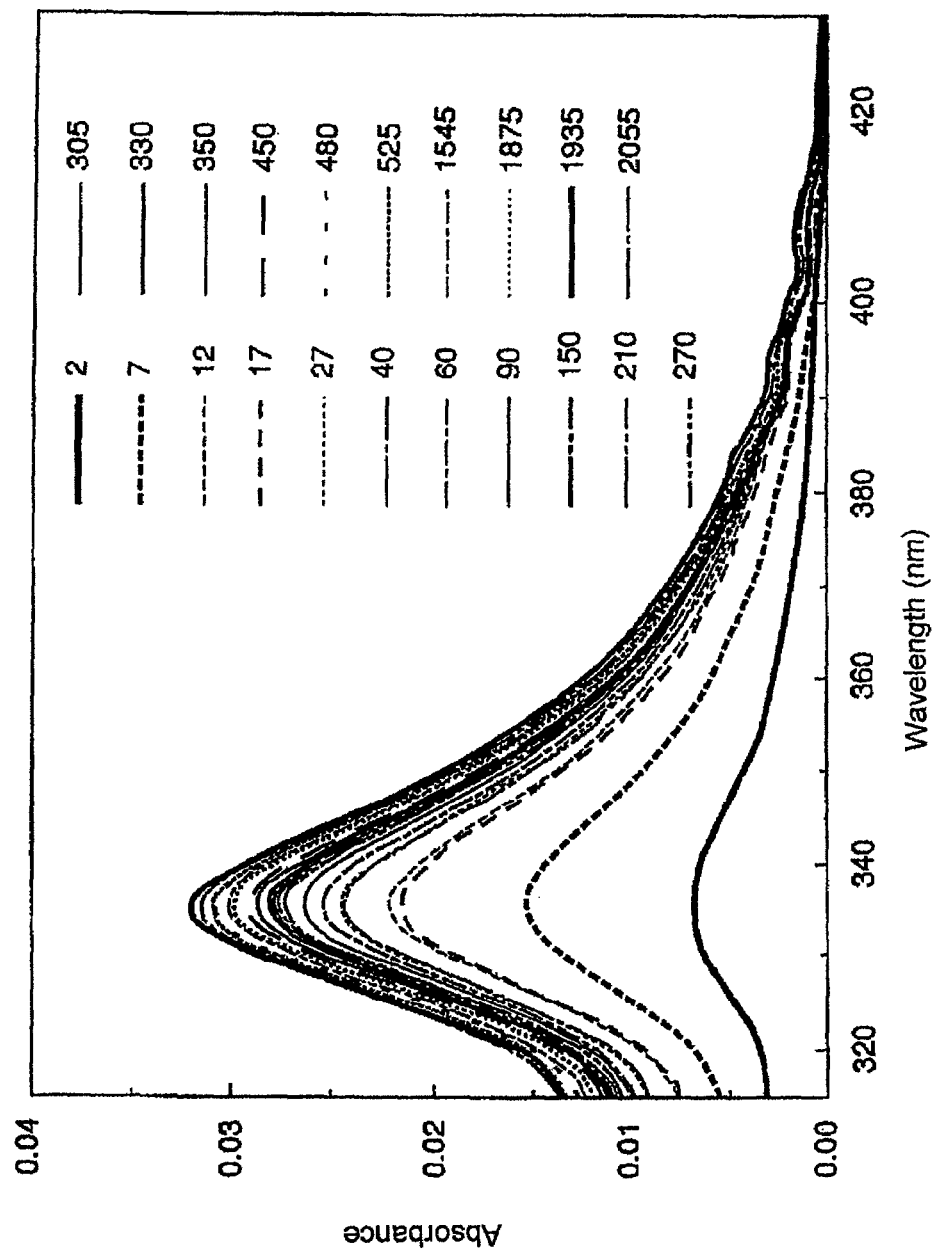
FIG. 5 illustrates ultraviolet-visible absorption spectra of Cyc/$C_{60}$@NHox prepared in Examples 1 to 4 of the present invention.
Figure 6:
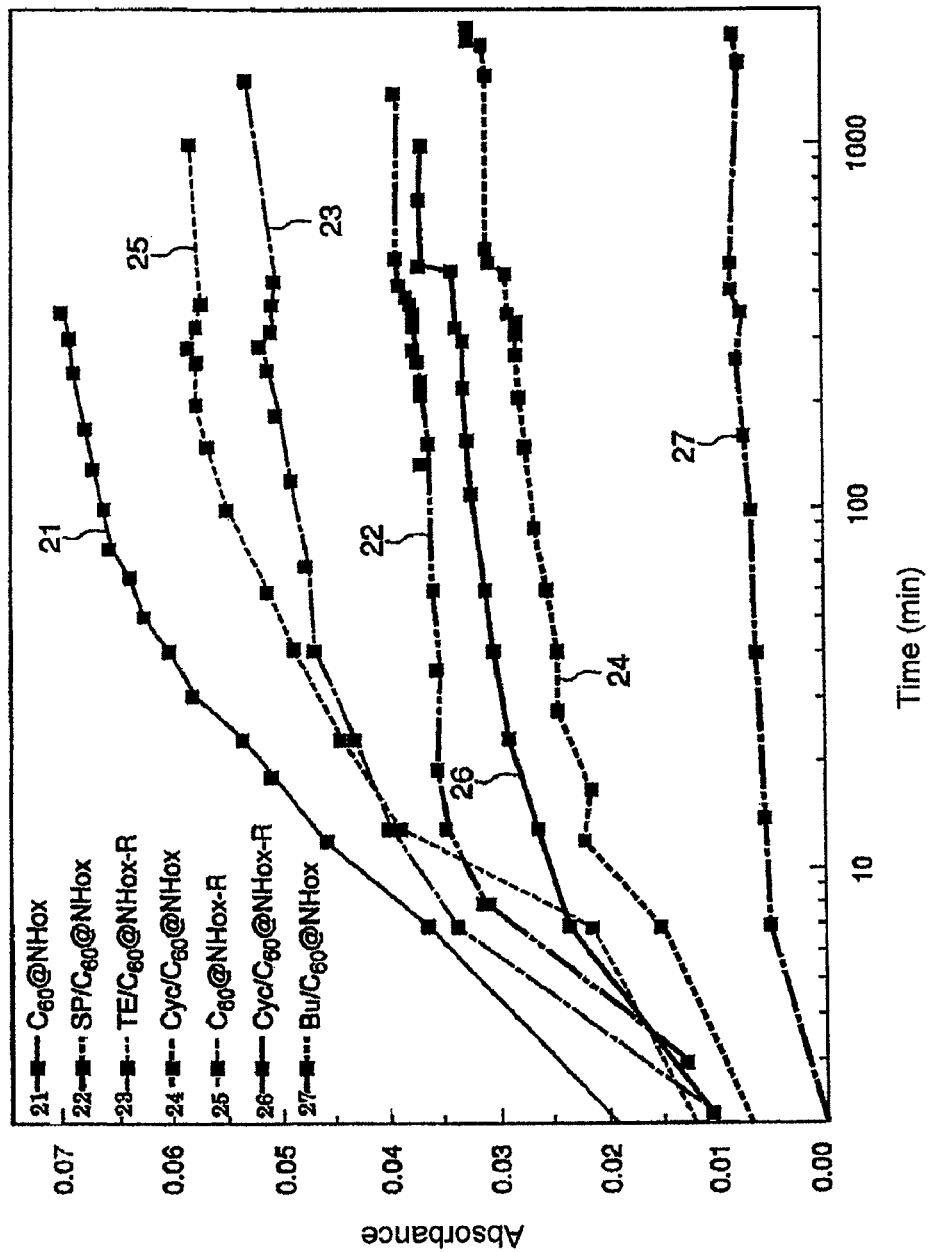
FIG. 6 is a graph illustrating the time dependency of the $C_{60}$ release amount which was obtained from the ultraviolet-visible absorption spectra of the samples prepared in Examples 1 to 4 of the present invention.
Figure 7:
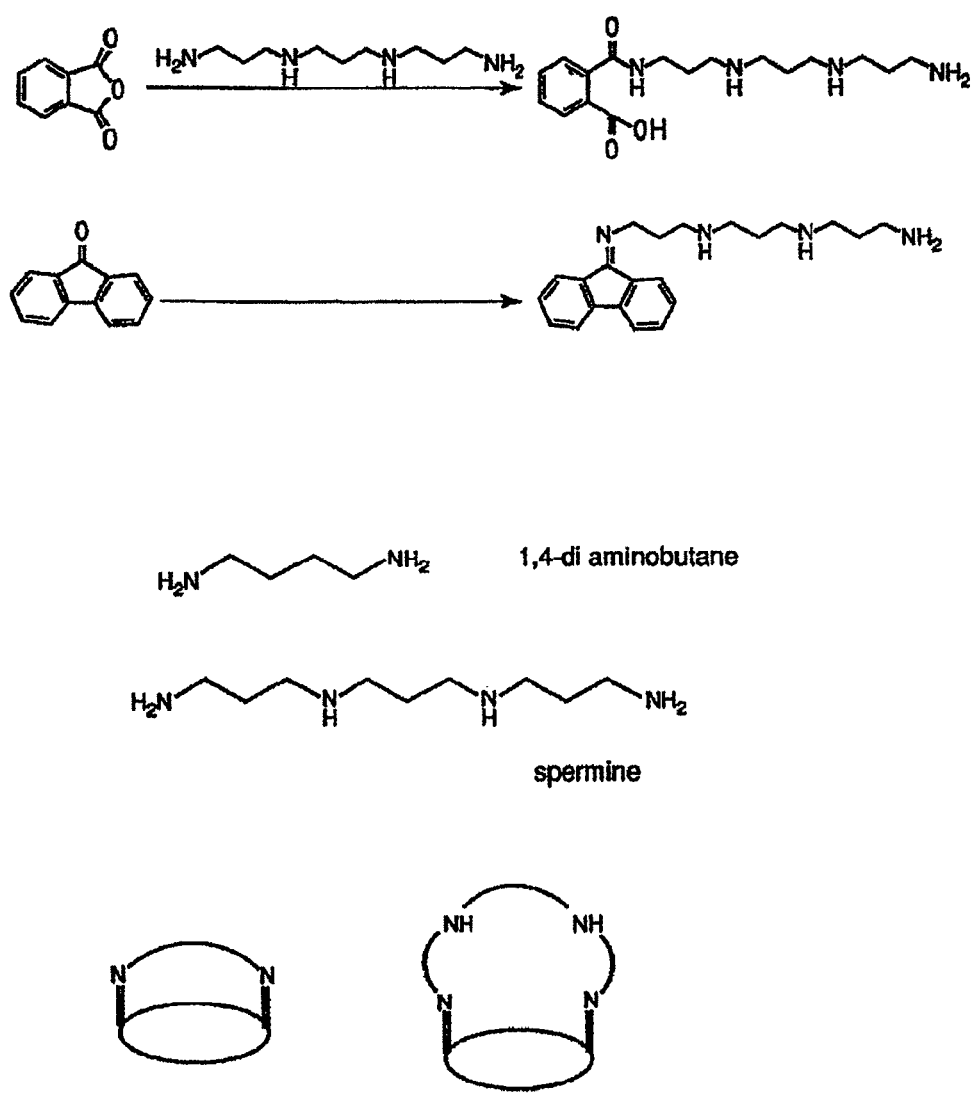
FIG. 7 is schematic illustration of the substitution reaction of an anhydride of NHox and a carbonyl group with an amine and of plugs.

FIG. 5 illustrates the UV/Vis absorption spectra of the $C_{60}$ released from Cyc/$C_{60}$@NHox in toluene at each prescribed time. FIG. 5 shows that the absorption at around 335 nm was due to the interband transition of the $C_{60}$ and the absorption was increased with time. In FIG. 6, the absorption intensity of the $C_{60}$ is plotted against time. In $C_{60}$@NHox shown by curve 21 of FIG. 6, the release of $C_{60}$ stabilized after about 400 minutes had elapsed. The $C_{60}$ release amount was found from the value of the absorbance at the time $C_{60}$ stabilized and the mole absorption coefficient 55000 $Lmol^{-1}cm^{-1}$. The found amount corresponded to 90% of the amount, estimated from the results of TGA, of the $C_{60}$ encapsulated in $C_{60}$@NHox.

This indicates that there remained about 10% of $C_{60}$ in $C_{60}$@NHox. This result almost agrees with the amount of the remaining $C_{60}$@NHox of FIG. 2. Based on this result, as shown in FIG. 6, the $C_{60}$ release amounts of the SP/$C_{60}$@NHox shown by curve 25, Cyc/$C_{60}$@NHox shown by curve 24, TE/$C_{60}$@NHox shown by curve 23 and Bu/$C_{60}$@NHox shown by curve 27 were compared with each other. Curves 25, 26 respectively show samples obtained by further plugging the samples shown by curves 21, 24 with triethylamine. The results all show that the $C_{60}$ release was saturated after about 300 minutes had elapsed. The $C_{60}$ release amounts at saturation indicate that Bu/$C_{60}$@NHox restrained the release of $C_{60}$, compared with $C_{60}$@NHox plugged with an amine larger than Bu, that is, SP, TE or Cyc. Only about 10% of the entire encapsulated $C_{60}$ was released from Bu/$C_{60}$@NHox. This suggests that the $C_{60}$ release amount relates to the size of the amine and an amine having a smaller molecular size functions as a plug more effectively. On the other hand, an amine having a larger molecular size makes the space between the surface functional group and the amine adsorbed thereto very large, and thus, it is probably unable to fully plug $C_{60}$@NHox.

Exemplary Embodiment 5

After the $C_{60}$ release amount is almost saturated, attempts were made to desorb the electrostatically adsorbed polyamine by adding trifluoroacetic acid dropwise to increase the acidity of the toluene solution. The change in the absorbance of $C_{60}$ after the addition of trifluoroacetic acid was very small. In other words, the plug could not be desorbed by increasing the acidity. This indicates that the reactions shown in FIG. 7 occurred between the amine and the substituents on the edge of NHox. Specifically, there existed many carbonyl groups and anhydride groups on the surface of NHox, and the amine formed amide linkages with such groups and was covalently adsorbed thereto. The amine plug, unlike Gd acetate, is not desorbed in an aqueous solution, and thus, the $C_{60}$ release amount can be controlled by selecting an appropriate amine plug.

INDUSTRIAL APPLICABILITY

A carbon nanohorn composite including a substance encapsulated therein and a polyamine plug according to the present invention can be applied to, for example, drug carriers for drug administration, catalysts, or ion-selective membranes.

The invention claimed is:

1. A carbon nanohorn composite comprising a carbon nanohorn, a substance encapsulated in the carbon nanohorn and a polyamine plug, characterized in that the polyamine plug is a polyamine molecule which plugs the opening part of the carbon nanohorn having been formed by oxidation, said polyamine molecule is selected from the group consisting of 1,4-di aminobutane, spermine, 1,1,4,7,10,10-hexamethyltriethylenetetramine and 1,4,8,11-tetramethyl-1,4,8,11-tetraazacyclotetradecane.

2. The carbon nanohorn composite comprising a carbon nanohorn, a substance encapsulated in the carbon nanohorn and a polyamine plug according to claim 1, characterized in that the amino group of the polyamine molecule used as a plug is chemically adsorbed to a surface functional group, a carbonyl group or an anhydride present on the opening part of the carbon nanohorn.

3. The carbon nanohorn composite comprising a carbon nanohorn, a substance encapsulated in the carbon nanohorn and a polyamine plug according to claim 1, characterized in that the substance encapsulated in the carbon nanohorn is any one selected from the group consisting of a metal, an inorganic material and an organic material, or a mixture of two or more thereof, or a compound thereof.

4. The carbon nanohorn composite comprising a carbon nanohorn, a substance encapsulated in the carbon nanohorn and a polyamine plug according to claim 3, characterized in that first the substance is encapsulated in the carbon nanohorn in a solution and then the opening of the carbon nanohorn is plugged with the plug of a polyamine molecule in a solution in which the encapsulated substance is not or hardly dissolved, whereby the encapsulated substance is not released from the inside of the carbon nanohorn during the plug formation.

5. The carbon nanohorn composite comprising a carbon nanohorn, a substance encapsulated in the carbon nanohorn and a polyamine plug according to claim 1, characterized in that the encapsulated substance dissolves out from the inside of the carbon nanohorn in the surrounding environment depending on the degree of the opening of the polyamine molecule plug, and is released in a controlled manner.

6. A method of controlling release of the encapsulated substance from the carbon nanohorn composite comprising a carbon nanohorn, a substance encapsulated in the carbon nanohorn and a polyamine plug according to claim 1, comprising structurally changing a polyamine molecule whose three-dimensional structure changes in the pH range of 4 to 7, causing changes in a ratio of the plugged portion of the opening part, thereby allowing the encapsulated substance to dissolve out in the surrounding environment and be released in a controlled manner.

7. A method of controlling release of the encapsulated substance from the carbon nanohorn composite comprising a carbon nanohorn, a substance encapsulated in the carbon nanohorn and a polyamine plug according to claim 1, comprising molecularly changing an amine whose substituent changes its molecular structure in the pH range of 4 to 7, thereby causing changes in at least one of a desorption ratio and a desorption amount of the encapsulated substance.

8. A method of controlling release of the encapsulated substance from the carbon nanohorn composite comprising a carbon nanohorn, a substance encapsulated in the carbon nanohorn and a polyamine plug according to claim 1, comprising desorbing a polyamine of the polyamine plug whose substituent desorbs in the pH range of 4 to 7, thereby allowing the encapsulated substance to dissolve out in the surrounding environment and be released in a controlled manner.

9. A drug delivery system comprising the carbon nanohorn composite comprising a carbon nanohorn, a substance encapsulated in the carbon nanohorn and a polyamine plug according to claim 1.

10. A drug delivery system comprising the carbon nanohorn composite comprising a carbon nanohorn, a substance encapsulated in the carbon nanohorn and a polyamine plug to which the release-controlling method according to claim 6 is applied.

11. A method for producing a carbon nanohorn composite comprising a carbon nanohorn, a substance encapsulated in the carbon nanohorn and a polyamine plug, the method comprising:
    forming an opening in the carbon nanohorn by oxidation;
    encapsulating the substance in the carbon nanohorn having the opening; and adding a cap to the substance encapsulated in the carbon nanohorn having the opening, characterized in that the method is used to produce the carbon nanohorn composite according to claim 1.

12. A carbon nanohorn composite comprising a carbon nanohorn, a substance encapsulated in the carbon nanohorn and a polyamine plug according to claim 1, characterized in that the polyamine molecule is selected by its size, substituent or three-dimensional structure so that at least one of the release amount and release rate of the encapsulated substance can be controlled.

13. A drug delivery system comprising the carbon nanohorn composite comprising a carbon nanohorn, a substance encapsulated in the carbon nanohorn and a polyamine plug to which the release-controlling method according to claim 7 is applied.

14. A drug delivery system comprising the carbon nanohorn composite comprising a carbon nanohorn, a substance encapsulated in the carbon nanohorn and a polyamine plug to which the release-controlling method according to claim 8 is applied.

* * * * *